United States Patent [19]
Heist et al.

[11] Patent Number: 6,160,684
[45] Date of Patent: Dec. 12, 2000

[54] HEAD SUSPENSION HAVING TABS AND FORCE ISOLATION WELDS FOR GRAM LOAD REDUCTION DURING SWAGING

[75] Inventors: William P. Heist, Morgan Hill; Kim Aimonetti; Dominic S. Biondo, both of San Jose; Larry E. Tucker, Fremont, all of Calif.

[73] Assignee: Read-Rite Corporation, Milpitas, Calif.

[21] Appl. No.: 09/190,883

[22] Filed: Nov. 12, 1998

[51] Int. Cl.[7] .................................................. G11B 5/48
[52] U.S. Cl. ........................................................ 360/244.5
[58] Field of Search ........................ 360/104, 244.5–244.7

[56] References Cited

U.S. PATENT DOCUMENTS 5,748,409   5/1998   Girard ...................................... 360/104
6,033,755   3/2000   Hanrahan ................................ 360/104

*Primary Examiner*—A. J. Heinz
*Attorney, Agent, or Firm*—Nathan N. Kallman

[57] ABSTRACT

A suspension assembly for a magnetic head reduces isolation forces caused by swaging the suspension to an actuator arm of a disk drive. The suspension is formed with a first end, and a second end having an inner periphery which defines an opening. Tabs extend from the inner periphery into the opening. A base plate with a cylindrical hub is welded to the tabs and the hub extends through the inner periphery. Multiple isolation welds formed on the suspension cooperate with the tabs to isolate forces and limit force propagation when the hub is swaged to the actuator arm.

16 Claims, 5 Drawing Sheets

HEAD SUSPENSION HAVING TABS AND FORCE ISOLATION WELDS FOR GRAM LOAD REDUCTION DURING SWAGING

FIELD OF THE INVENTION

The invention relates to hard disk drives and in particular to head suspensions for hard disk drives.

DESCRIPTION OF THE PRIOR ART

Hard disk drives are used in most personal computers, in mass memory storage systems and in other machines. A typical hard drive includes an enclosure with at least one disk, a spindle motor and an actuator arm with a magnetic recording head. The motor rotates the disk. As the disk rotates, the actuator arm pivots to pass the recording head over the disk surface to read and write data to the disk.

The actuator arm has two ends. One end mounts on a pivot bearing. The other end of the actuator arm supports a head suspension, to which a magnetic head is assembled. Typically, the magnetic head is formed with an air bearing surface, and during operation flies closely over the disk surface to enable data signals to be recorded and read.

Disk rotation creates pressure adjacent to the disk surface, which lifts the suspension and head from the disk surface. The suspension is spring loaded to resist the lifting force and urges the head towards the disk surface. This resistive force is termed the "gram load". At a desired rotational rate, the gram load and lifting forces balance, allowing the head to float a precise distance from the disk surface.

FIG. 3, for example, shows a known suspension and actuator arm assembly. The assembly has a base plate 52, sometimes referred to as a nut plate assembly, and a suspension 54. The suspension 54 has a circular opening 56. The base plate 52 has a cylindrical hub 58, which extends through the opening 56. Welds attach the base plate 52 to the actuator arm end of the suspension 54, locating the hub in the center of the opening 56. Typically four or six laser welds are used to attach the base plate 52 to the suspension 54.

The suspension 54 is formed from a strip of spring metal having two ends and a bend radius region 55 defined between the ends. The magnetic head is fixed at one end. The other end attaches to the actuator arm 20 by a process known as swaging. During swaging, swage balls of incremental size swage through the hub 58, expanding the hub 58 against the actuator arm 20 to hold the suspension 54 in place with respect to the actuator arm 20. Stresses caused by the swaging process propagate from the base plate via the welds to the bend radius region 55 of the suspension and affect suspension gram load.

The swaging process may inconsistently affect the bend radius region 55, and other parts of the suspension, changing the gram load of the suspension. The magnitude of change in gram load varies, even under closely regulated manufacturing conditions. In some instances, where the desired gram load is in the range of 2–3 grams, swaging may cause gram load changes of ½ gram, or more. Ideally, gram load changes should be consistent and predictable during the suspension/actuator arm assembly process.

The gram load directly affects disk drive operation. When, for example, swaging changes the gram load beyond an acceptable range, the head may not record, or read, data properly. To avoid this problem, the suspension is reworked during assembly. Where reworking fails, the whole suspension-actuator arm assembly may have to be de-swaged (removed) and discarded. Optimally, the gram load change will be slight and consistent, and thus the suspension and head assembly will not need to be reworked or discarded. What is desired is a way to minimize inconsistency of gram load changes caused during swaging.

SUMMARY OF THE INVENTION

A suspension for a magnetic head includes a first end, a second end and a bending radius region defined between the ends. The bending radius region is configured to preload the suspension. A magnetic head is attached to the first end. Preloading the suspension determines the gram load.

A base plate is welded to the second end of the suspension. The base plate includes a hollow cylindrical hub. The second end of the suspension has an inner periphery defining an opening. The hub inserts through the opening to swage the suspension to an actuator arm of a disk drive. The present invention minimizes stress imposed on the suspension by the swaging process. This minimization of stress, reduces variability and magnitude of gram load changes, which stem from the swaging process.

According to one aspect of the invention, the inner periphery of the suspension includes tabs to minimize force propagation between the base plate and the suspension by isolating forces caused by swaging. According to another aspect of the invention, multiple isolation welds surround the inner periphery to isolate forces caused by the swaging process. The invention can use tabs of uniform length, or varying length. The inner periphery can be generally square, rectangular, or circular in shape to surround the hub. The tabs are preferably parabolic in shape, being rounded, or triangular and pointed. The isolation welds cooperate with the tabs to limit force propagation.

BRIEF DESCRIPTION OF THE DRAWING

The invention will be described in greater detail with reference to the drawings in which.

DETAILED DESCRIPTION OF THE INVENTION

Figure 1:
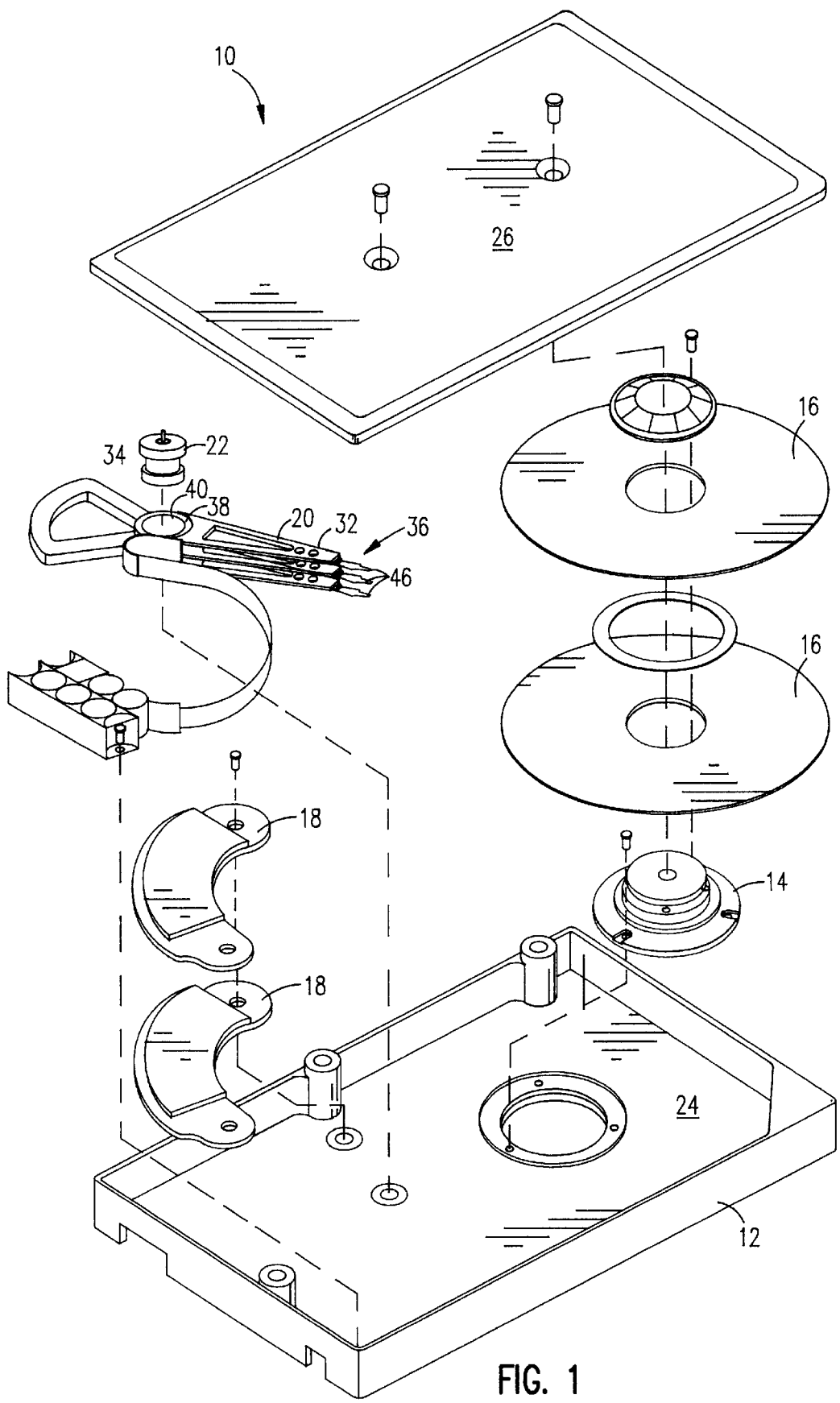
FIG. 1 is an exploded perspective view of a disk drive in accordance with the present invention.

FIG. 1 shows a disk drive 10 that includes an enclosure 12, a disk spindle motor 14, disks 16, an actuator magnet assembly 18, an actuator arm 20, a pivot bearing assembly 22, and a suspension assembly 36. The suspension assembly 36 supports heads 46, which read from and write data to the disks 16.

The enclosure 12 has a base 24 and a cover 26. The actuator magnet assembly 18 mounts on the base 24. The pivot bearing assembly 22 mounts the actuator arm 20 on the base 24 in operative proximity to the actuator magnet assembly 18. The cover 26 attaches to the base 24 and seals the enclosure 12.

Figure 2:
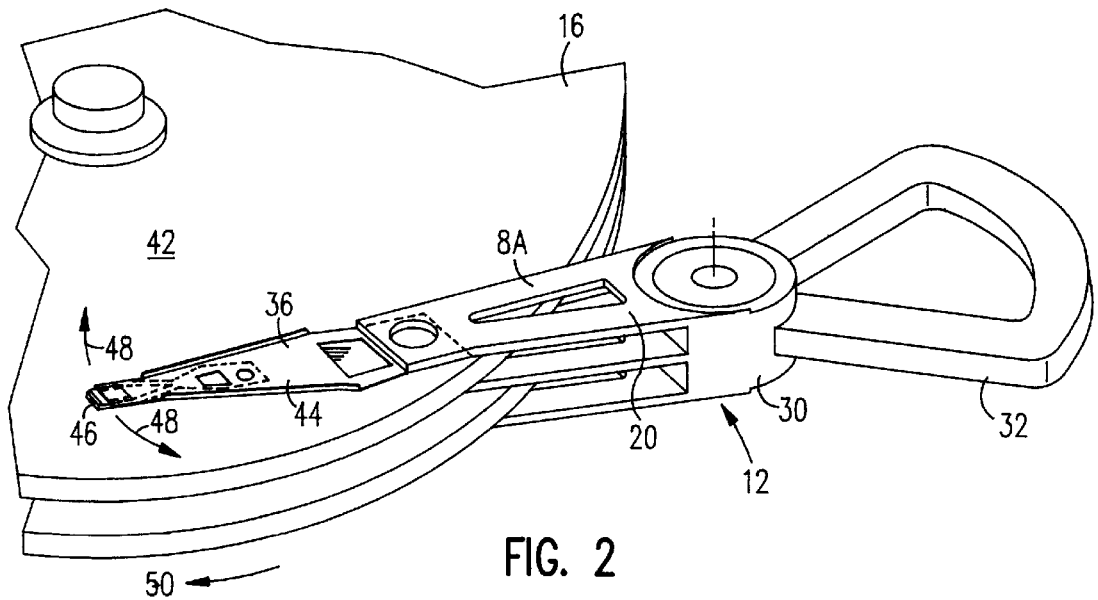
FIG. 2 is a perspective view of the actuator arm assembly of FIG. 1.
Figure 3:
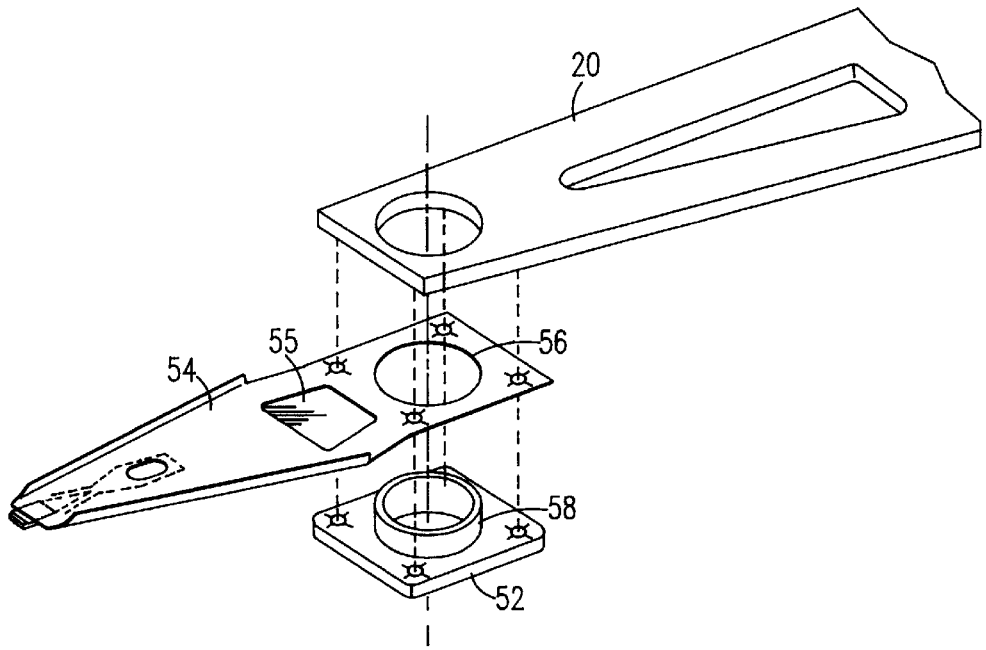
FIG. 3 is an exploded perspective view of a prior art actuator arm and suspension.

The actuator arm 20 has two ends 32 and 34. The suspension assembly 36 mounts on the end 32 of the actuator arm 20. The disk spindle motor 14 and the disks 16 mount on the base 24 in operative alignment with actuator arm 20. The disk spindle motor 14 rotates the disks 16 and the actuator arm 20 pivots the suspension assembly 36 to enable the heads 46 to co-act with the disks 16 for transducing data signals. It can be appreciated that while magnetic heads and disks having a magnetically readable surface are used in disk drives, the present invention is also useful in conjunction with other devices having, for example, optically readable media and heads FIG. 2 shows the actuator arm 20. The suspension assembly 36 includes a suspension 44 and a head 46. The disk 16 has a surface 42. The disk 16 spins in the direction of the arrow 50. The arm 20 reciprocates along an arc indicated by the arrows 48. Rotation of the disk 16 creates air pressure, which lifts the head 46 and floats the head 46 above the disk surface 42. Flying the head 46 enables the arm 20 to pivot without contacting the disk surface 42. In this embodiment, although the head floats, the present invention can be used in devices having a head in contact with a magnetic medium. In any instance, the suspension 44 precisely regulates gram load.

The suspension 44 applies a gram load on the head 46 in a direction towards the disk 16, opposing the head 46 lifting force caused by disk 16 rotation. Accordingly, the distance between the head 46 and the disk surface 42 depends on the gram load applied by the suspension 44.

Figure 4:
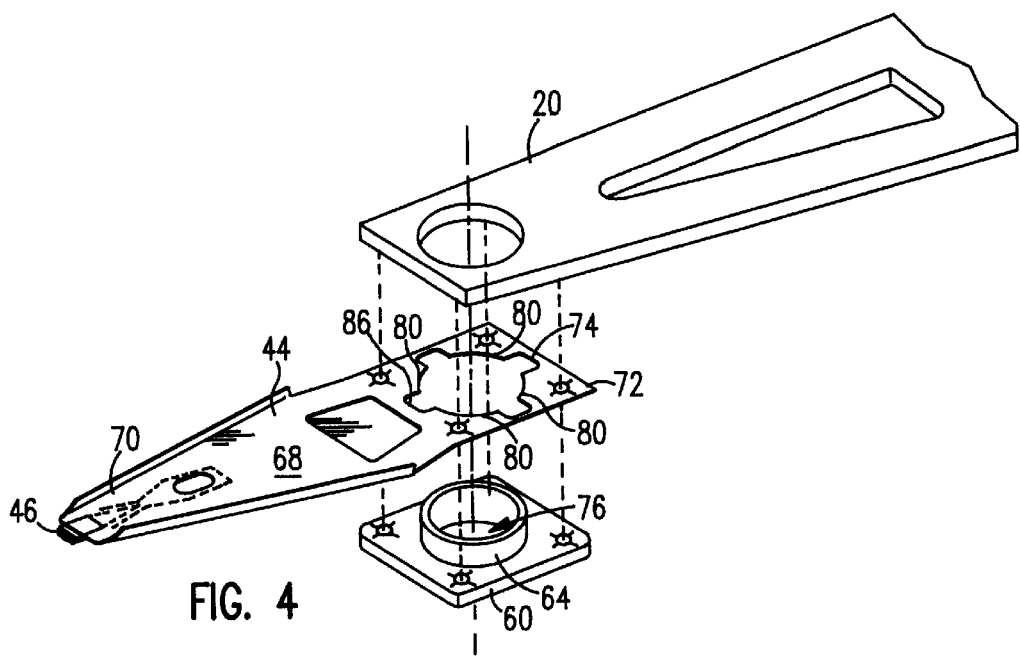
FIG. 4 is an exploded perspective view of the actuator arm, base plate and suspension in accordance with the present invention.

FIG. 4 shows the actuator arm 20, a base plate 60, the suspension 44 and the magnetic head 46. The base plate 60 includes a hub 64. The suspension 44 has a first end 70 and a second end 72. The second end 72 has an inner periphery 74, which defines an opening 76. The hub 64 has an outside diameter. The opening 76 is larger than the hub 64 outside diameter to enable the hub 64 to freely fit through the opening 76. According to one aspect of the invention, the opening 76 diameter exceeds the hub outside diameter, preferably within the range of 0.2 to 4.0 mm to isolate force and minimize force propagation from the base plate to the suspension.

The inner periphery 74 has tabs 80. The tabs 80 extend radially into the opening 76, defining interstices 86 between each tab 80. The tabs 80 have a nominal geometry, which does not normally change during the swaging process. The interstices 86 are defined between each tab 80 to isolate forces, and force propagation, between the base plate 60 and the suspension 44. The tabs 80 and interstices 86 isolate forces, and force propagation, between the first end 70 and second end 72 of the suspension 44. Accordingly, the present invention reduces the degree to which, swaging affects gram load and minimizes undesired gram load variability between actuator arm assemblages during swaging.

Figure 5:
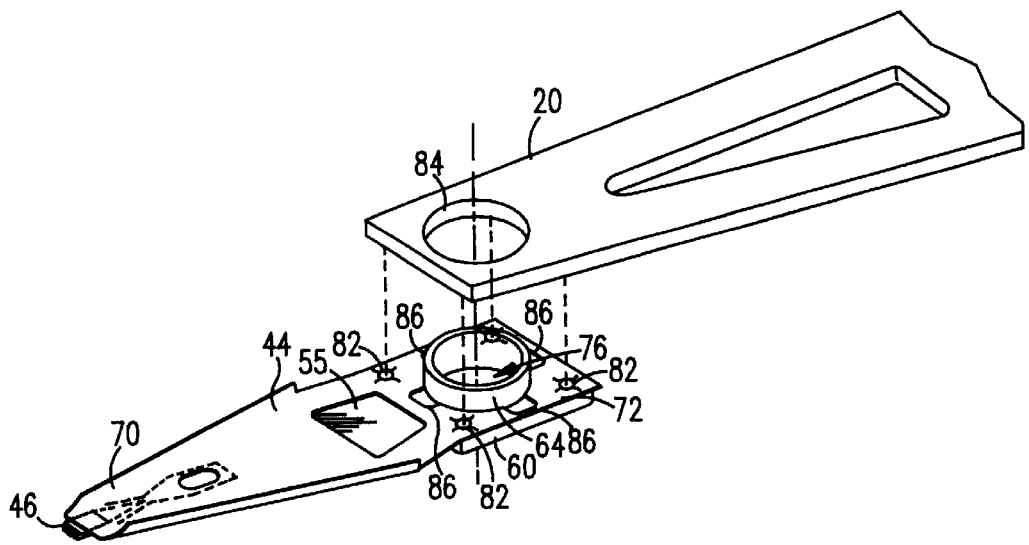
FIG. 5 is an exploded perspective view of the assembly of FIG. 4 with the base plate welded to the suspension.

FIG. 5 shows the actuator arm 20 and suspension 44 of FIG. 4. The base plate 60 welds to the second end 72 of the suspension 44 at welds 82. The hub 64 includes a hollow cylinder, which extends through the opening 76. The actuator arm 20 includes an exactly circular opening 84 sized to enable the hub 64 to swage to the actuator arm 20 opening 84.

During swaging, the hub 64 extends through the opening 84. Swage balls of incrementally increasing diameter press through the hub, and press the hub 64 outside diameter against the edges of the opening 84 to hold the suspension 44 with respect to the actuator arm 20. The tabs 80 of the suspension 44 partially surround the hub 64, isolating forces from the hub 64 and inhibiting propagation of forces form the hub to the suspension 44 particularly to the bend radius region 55.

Figure 6:
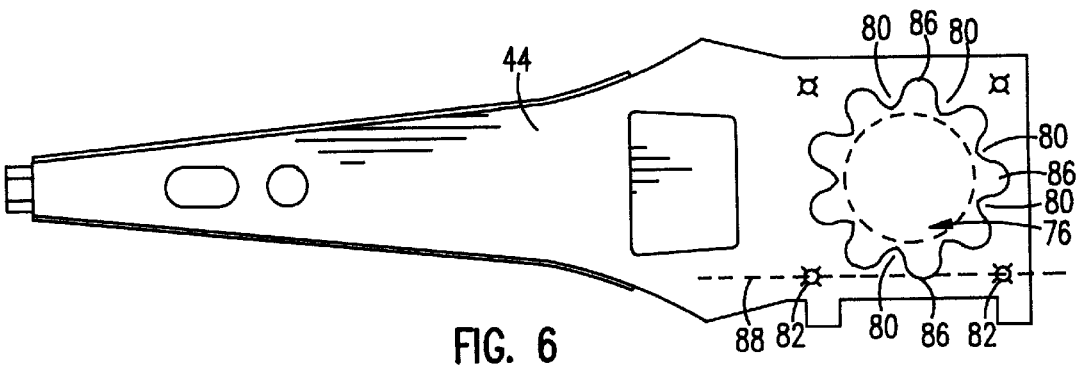
FIGS. 6–14 are top views of alternative embodiments of the suspension of FIG. 4 in accordance with the present invention.

FIG. 6 shows a view of one embodiment of the suspension 44. The suspension includes multiple tabs 80 extending from the inner periphery 74. The tabs 80 are uniform in length and are generally parabolic in shape. The tabs 80 are integrally formed with the suspension 44.

The suspension 44 includes four welds 82 arranged in a square configuration surrounding the inner periphery 74. The interstices 86 and tabs 80 intersect distances between adjacent welds 82. To illustrate, one interstice 86 and one tab 80 intersects the line 88, which is drawn between adjacent welds 82. In an alternate embodiment of the invention, the interstice 86 and tab 80 bisect the distance between adjacent welds 82. In another variation of the invention, multiple tabs 80 and interstices 86 intersect the distance between adjacent welds.

Figure 7:
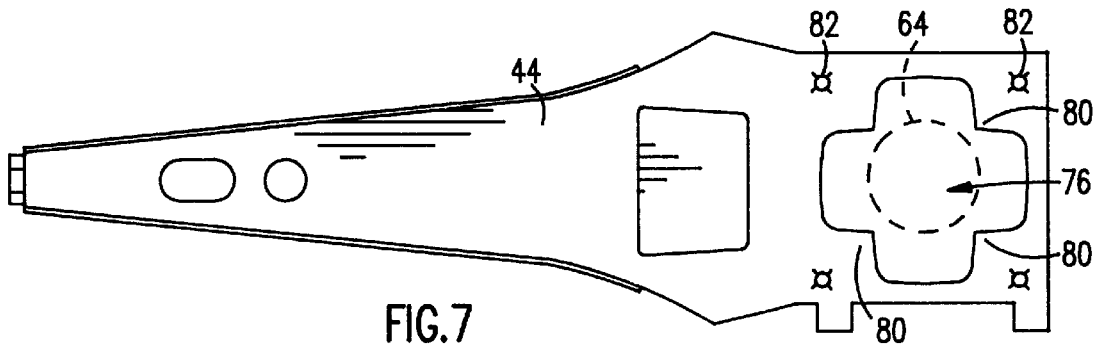

FIG. 7 shows a view of one embodiment of the suspension 44. The welds 82 are defined on each tab 80. The tabs 80 are generally triangular in shape and pointed radially inward towards the center of the opening 76. The opening 76 surrounds the rim of the hub 64.

Figure 8:
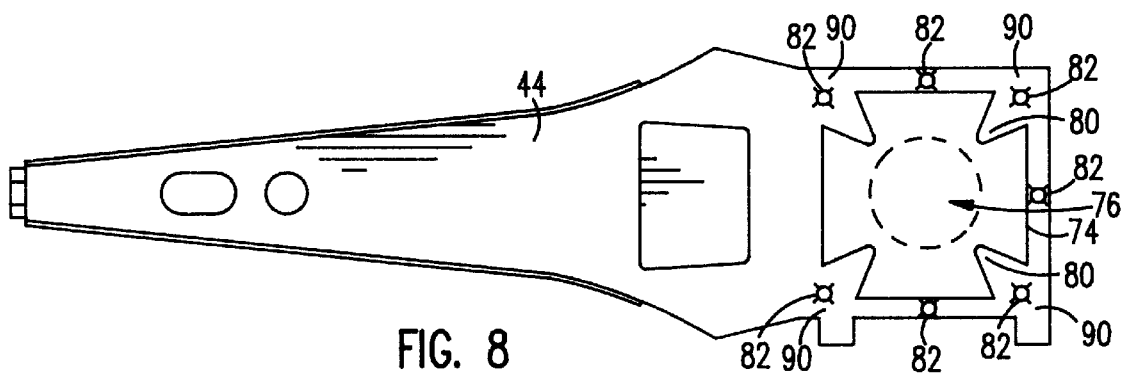

FIG. 8 shows the suspension having a generally square inner periphery 74 defining the opening 76. The inner periphery 74 has four corner regions 90. The tabs 80 are generally parabolic in shape and extend from each of the corner regions 90. Each tab 90 includes one weld 82. The inner periphery 74 has four sides. Each side has a weld 82.

Figure 9:
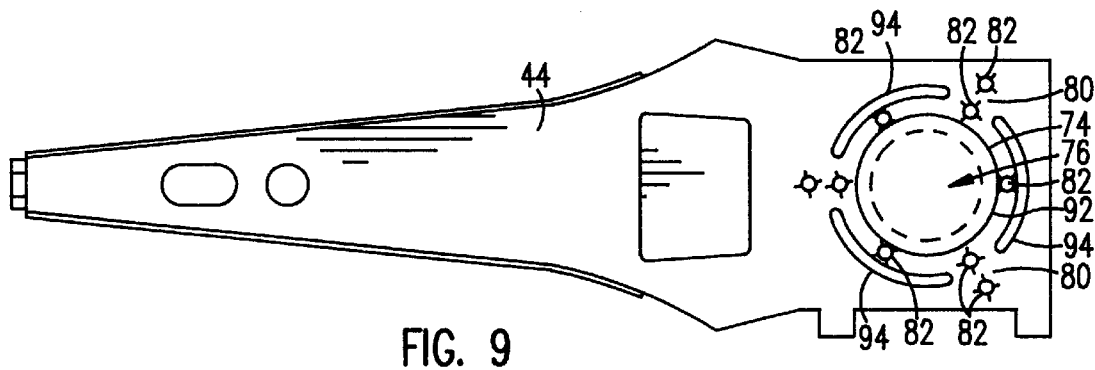

FIG. 9 shows the suspension 44. The tabs 80 interconnect, forming a second inner periphery 92. The tabs 80 define three arcuate openings 94 adjacent the second inner periphery 92, and between the second inner periphery 92 and the inner periphery 74. Each tab includes a pair of welds 82 in radial alignment with respect to the axis of the opening 76. A weld 82 is positioned between the inner periphery 74 and each arcuate opening 94.

Figure 10:
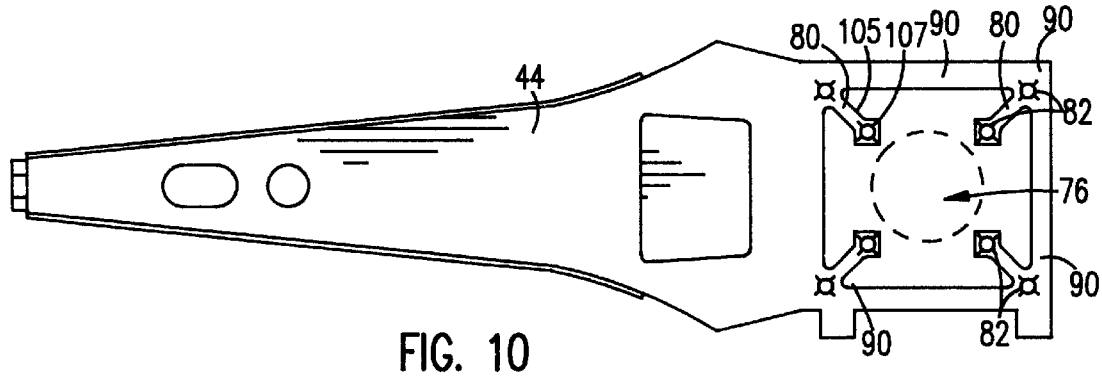

FIG. 10 shows the suspension 44 having a generally square inner periphery 74 having four corners 90. The tabs 80 extend from each of the corners 90. The suspension 44 has welds 82 on each tab 80. The welds 82 are paired in radial alignment with respect to the cylindrical hub 64. The welds 82 are located on each tab, or every other tab, according to the particular tab and weld design. The welds 82 radially align to isolate force caused by swaging. The tabs 80 include a neck region 105 and a generally diamond shaped end 107. The neck region 105 cooperates with the welds to isolate forces caused by swaging. The diamond-shaped end enables the base plate to form a solid weld to the tab 80. It can be appreciated that although a diamond-shaped end 107 is shown, a spaded or rounded shaped end can be readily welded to the base plate (FIG. 5).

Figure 11:
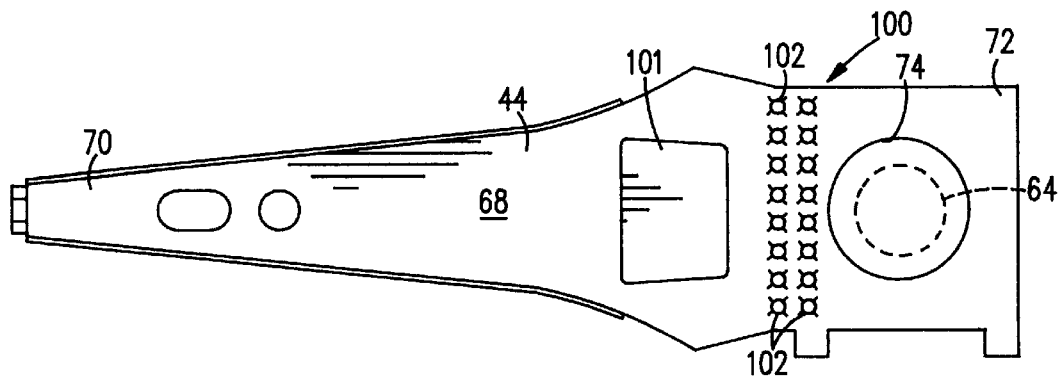

FIG. 11 shows a suspension for a magnetic head including a strip of force isolation elements 100, which extend across a portion of the suspension 44 to isolate the second end 72 from the first end 70. According to one aspect of the invention, the force isolation elements 100 include multiple isolation welds 102 aligned in parallel and extending linearly across the suspension 44.

The suspension 44 includes a bend radius region 101 for regulating gram load. The welds 102 extend adjacent the bend radius region 101, between the bend radius region 101 and the inner periphery 74. According to one aspect of the invention, the welds cross a portion of the suspension, adjacent the hub 64. In an alternate embodiment, the welds 102 extend fully across the suspension 44. The strip of force isolation features 100 extends across the suspension 44 to minimize stress communicated from the base plate, to the bend radius region 101.

Figure 12:
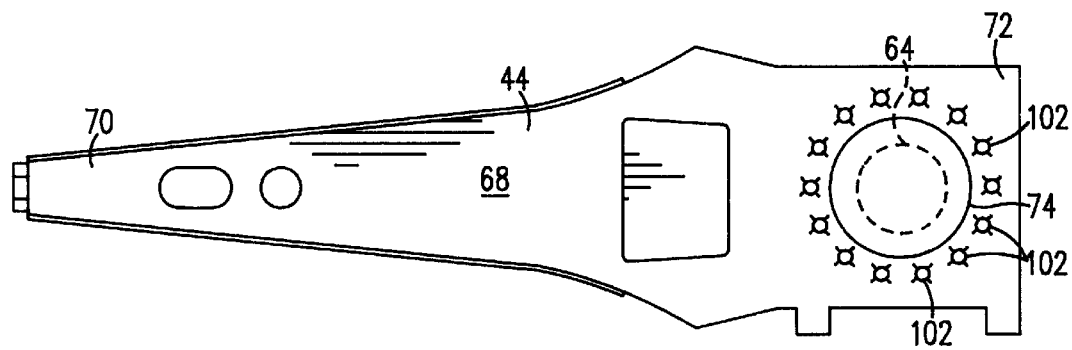

FIG. 12 shows a suspension 44 having a first end 70 and a second end 72. The inner periphery 74 is defined at the second end 72. The suspension 44 includes a strip of isolation welds 102 encircling the hub 64 to isolate force and to minimize propagation of force between the second end 72 and the first end 70. Preferably, 8–16 laser welds 102 encircle the hub 64.

Figure 13:
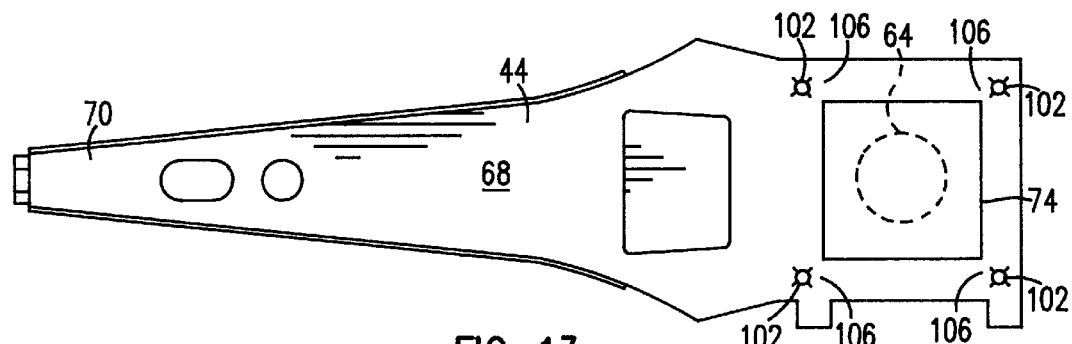

FIG. 13 shows the inner periphery 74 having a generally square cross-section and four corners 106. The inner periphery 74 defines an area larger than the area defined by the hub 64. The welds 82 stand adjacent each corner 106 of the inner periphery 74.

Figure 14:
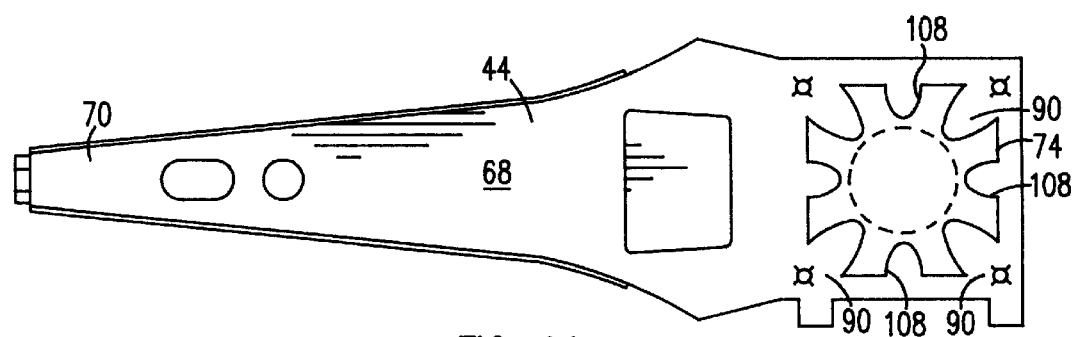

FIG. 14 shows the suspension 44. The suspension 44 has an inner periphery 74 with sides 108 and corners 90, and eight tabs 80 of non-uniform length. The tabs 80 extend from the sides 108 and corners 90. The tabs 80 extending from the corners 90 are longer than the tabs 80 extending from the sides 108. Each tab 80 extending from the corners 90 has a weld 102 to attach the suspension 44 to the base plate (FIG. 5). Accordingly, every other tab 80 includes a weld 102.

By virtue of this invention, a head suspension is swaged to an actuator arm of a disk drive so that suspension gram load changes normally associated with the swaging process are significantly reduced. The method includes providing a suspension with two ends, an inner periphery at one end, and a magnetic recording head at the other end, and tabs that extend from the inner periphery. The tabs define interstices between each tab which enable the tabs to absorb forces.

The novel assembly provides a base plate with a hub welds to each of the tabs, or every other tab. While the base plate welds to the tabs, additional welds can attach the base plate to other regions of the suspension, adjacent the inner periphery. Alternatively, the welds can be between the tabs.

The hub extends through the inner periphery of the suspension to enable the suspension to swage to the actuator arm. The actuator arm has an opening. The hub extends through the actuator arm opening. Swage balls, in increasing size, press through the hub to attach the suspension to the actuator arm. The tabs are configured in selected shapes to absorb forces, and thereby reduce suspension gram load changes developed during the swaging process.

What is claimed is:

1. A magnetic head assembly comprising:
    a head suspension having a first end and a second end, the second end having an inner periphery defining an opening;
    a magnetic head attached to the first end for transducing data signals;
    a base plate having a hub, the base plate being welded to the second end, wherein the hub extends through the inner periphery;
    a plurality of tabs attached to the inner periphery, said tabs extending into said opening, said tabs disposed uniformly and evenly spaced around said hub;
    a multiplicity of force isolation elements disposed uniformly and spaced evenly adjacent to said hub to isolate forces imposed on the suspension by the base plate;
    whereby said tabs and force isolation elements cooperate to isolate forces and thereby limit force propagation during swaging of said suspension to an actuator arm.

2. An assembly as set forth in claim 1, wherein said strip of force isolation welds attach the base plate to the second end, and wherein the welds align radially from the hub.

3. An assembly as set forth in claim 1, wherein the tabs are parabolic in shape.

4. An assembly as set forth in claim 1, wherein the tabs are pointed.

5. An assembly as set forth in claim 1, wherein the tabs interconnect.

6. An assembly as set forth in claim 1, wherein the interconnected tabs form arcuate openings.

7. An assembly as set forth in claim 1, wherein the inner periphery has four corners, and wherein one tab extends from each of the corners.

8. An assembly as set forth in claim 1, wherein the inner periphery has four sides, and wherein one tab extends from each of the sides.

9. An assembly as set forth in claim 1, wherein the tabs are uniform in length.

10. An assembly as set forth in claim 1, wherein the tabs vary in length.

11. An assembly as set forth in claim 1, wherein the inner periphery has four sides and four corners, and tabs extending from each of the sides and each of the corners, and wherein the tabs extending from the corners are longer than the tabs extending from the sides.

12. An assembly as set forth in claim 1, wherein the inner periphery is generally rectangular in shape.

13. An assembly as set forth in claim 1, wherein the force isolation elements include a strip of isolation welds.

14. An assembly as set forth in claim 13, wherein the strip of welds extends linearly across the suspension.

15. An assembly as set forth in claim 13, wherein the suspension includes a bend radius region, and said strip of welds extends across the suspension between the bend radius region and the inner periphery.

16. An assembly as set forth in claim 13, wherein said strip of isolation welds encircle the hub to weld the base plate to the second end.

\* \* \* \* \*